(No Model.)
S. H. TERRY.
CAR FOR CABLE WAYS.
No. 329,786. Patented Nov. 3, 1885.
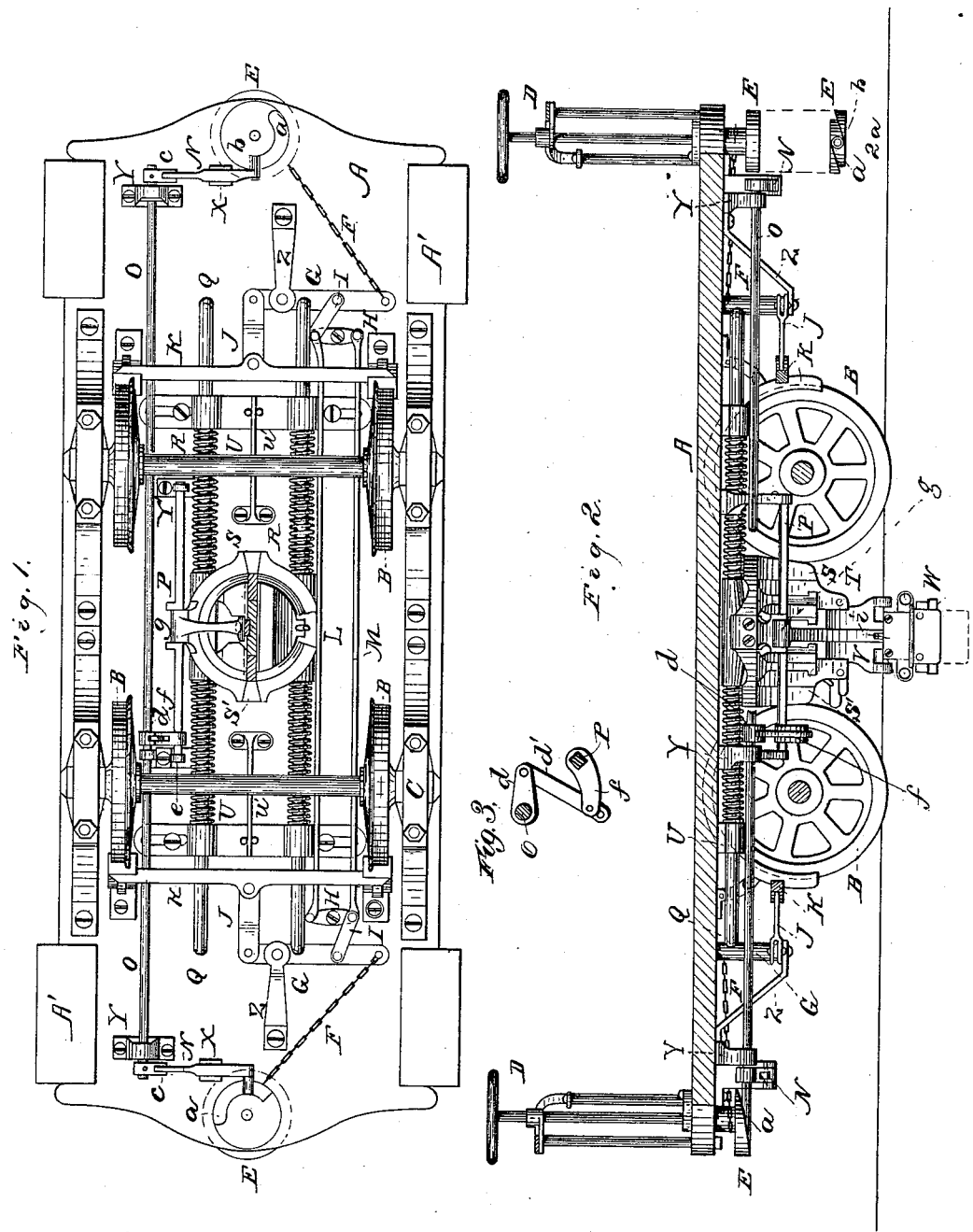
Witnesses.
Inventor.
Attorneys.

UNITED STATES PATENT OFFICE.

SAMUEL H. TERRY, OF CHICAGO, ILLINOIS, ASSIGNOR, BY MESNE ASSIGN-MENTS, OF ONE-HALF TO A. WALTER NESBIT AND MARY A. NESBIT, BOTH OF FULTON, MISSOURI.

CAR FOR CABLE WAYS.

SPECIFICATION forming part of Letters Patent No. 329,786, dated November 3, 1885.

Application filed October 5, 1882. Serial No. 73,480. (No model.)

*To all whom it may concern:*

Be it known that I, SAMUEL H. TERRY, residing at Chicago, in the county of Cook and State of Illinois, and a citizen of the United States, have invented new and useful Improvements in Cars for Cable Ways, of which the following is a full description, reference being had to the accompanying drawings, in which—

Figure 1 is an under view of the car; Fig. 2, a longitudinal section of the car-base, the body being omitted, and Fig. 3 a detail view to more clearly illustrate the connection between the rock-shafts which actuate the gripper.

The object of this invention is to so combine the brake of a grip-car with the gripper that the movement by which the gripper is set or clamped will release the brake, and the movement by which the brake is set will release the gripper; and its nature consists in the combinations hereinafter described and claimed as new.

In the drawings, A indicates the base or platform of a car; A', steps; B, wheels; C, axle-bearings; D, hand-wheel and shaft for operating the gripper and brake; E, head on the lower end of the hand-wheel shaft for operating the gripper; F, chain connecting the hand-wheel shaft with the brake-lever; G, brake-lever; H, pivot-bar; I, link connecting the pivot-bar H with the lever G; J, link connecting the lever G with the brake-bar; K, brake-bar; L M, rods connecting the brake system of each end of the car together; N, lever or pivot bar for connecting the head or plate E with the arm *c* and the rock-shaft; O P, rock-shafts; Q, bars for supporting the gripper; R, springs on the bars Q; S S', circular head for attaching the gripper to the car; T, additional supports for the edge of the gripper-blade; U, sliding plates for supporting the bars Q; V, gripper-blade; W, gripper; X, pivotal support for the bar N; Y, boxes or bearings for the shaft O, and Z bracing supports for the brake-lever G; *a*, cam-groove or inclines on the head E; *b*, pin or bent end of the lever N, operated by the cam-groove or cams *a*; *c*, arms on the shaft O, connecting it with the levers or bars N; *d*, arm projecting downward from the rod O; *e*, one of the bearings or supports for the shaft P; *f*, arm on the shaft P, connecting with the arm *d* of the shaft O; *g*, arm on the shaft P, connecting it with the gripper-blade, so as to open and close the gripper, and also to elevate the gripper when it may be desired by continuing the movement of the arm *g*.

The car may be of any of the street-car constructions, or it may be adapted specially for use as a grip-car. It is provided at each end with the hand-wheel and shaft D, for operating a cable-gripper and a brake from either end of the car. The brake is operated from the shaft D by means of the chain F, which connects with the lever G, which lever is pivoted at its upper end to bearings in the bottom of the car and its lower end in the bracing support Z, and by means of the link J the movement of the lever G by the chain moves the brake-bar K and sets its brake-shoes against the wheels. The same movement, also, by means of the link I, turns the bar H, and by means of the bars L or M, or both of them, operates a similar bar, H, at the other end of the car, which, by its corresponding link, I, moves the other lever, G, and by the link J also sets the brake for the wheels at the other end of the car, so that by turning the shaft D by either of the hand-wheels both of the brakes will be set. It is evident that the pivot-bars H can be moved by either of the rods L or M; but I prefer to use both, as they can then be made much lighter, and one of them is always drawing, instead of pushing at times, as in the case of a single one. The head E on the shaft D is provided with a cam, *a*, which is arranged to operate the pin *b* both up and down, to operate the gripper. The pin *b* is connected with a lever or balance bar, N, which connects with the arm *c* of the shaft or rock-shaft O. The shaft is supported in the bearings Y, and is so connected with the hand-wheel E by the bar N that whenever the hand-wheel shaft is turned in a direction to set the brake it will release the gripper, and whenever it is turned in a direction to attach the gripper the brake will be released, and for this purpose a direct connection between the shaft O and the gripper may be made. In the car shown the connection is made by connecting the arm $d$ of the shaft O by means of the link $d'$ with the arm $f$ of the shaft P, which carries the arm $g$ for operating the gripper. This is the best form for operating the devices shown.

The construction and operation of the other parts of the car shown is not here fully described, for the reason that they will be found described at length in an application heretofore filed by me and from which this application is taken.

I do not herein broadly claim a tramway-car having a gripper located beneath the car and centrally with relation to all the supporting-wheels, as such forms the subject-matter of a separate application for Letters Patent.

What I claim as new, and desire to secure by Letters Patent, is—

1. The combination of the hand-wheel shaft D and head E with the chain F and rocking bar or lever N, for combining the brake and gripper systems to be operated together, substantially as specified.

2. The combination of the shafts D D and heads E with the chains F F, pivoted bars or levers N N, brake-levers G, and rock-shaft O, whereby the gripper and the brakes may be operated from either end of the car, substantially as described.

SAMUEL H. TERRY.

Witnesses:
ALBERT H. ADAMS,
O. W. BOND.